T. H. Trantham,
Cotton Scraper.

No. 113,367. Patented Apr. 4, 1871.

Witnesses.
J. N. Sypherd.
Alonzo Hughes

Inventor.
Thos. H. Trantham.

UNITED STATES PATENT OFFICE.

THOMAS H. TRANTHAM, OF DE SOTO COUNTY, MISSISSIPPI.

IMPROVEMENT IN COTTON-SCRAPERS.

Specification forming part of Letters Patent No. 113,367, dated April 4, 1871; antedated March 29, 1871.

*To all whom it may concern:*

Be it known that I, THOMAS H. TRANTHAM, of De Soto county, State of Mississippi, have invented certain Improvements in Dirting Cotton, also Scraping Cotton, of which the following is a specification.

The first part of my invention relates to the shape and mode of attaching to any shovel-plow which acts as a frame or bearing for the scraper, this my scraper, and does away with the double work of first dirting and then scraping.

Figure 1:
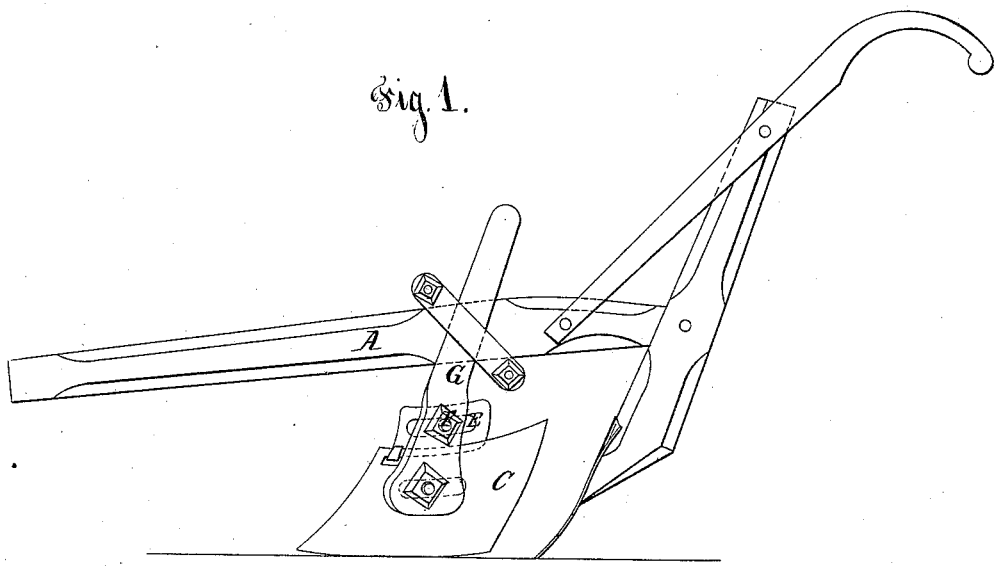
Figure 2:
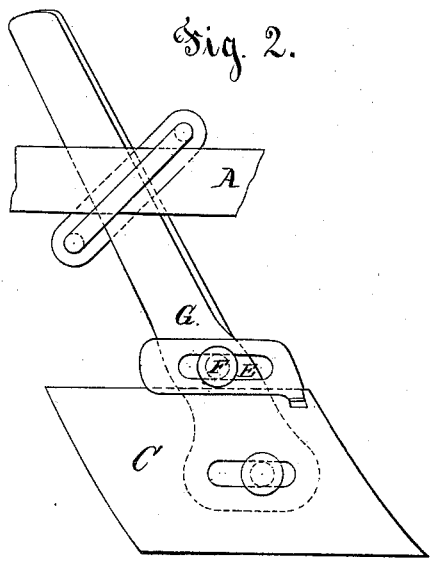

Figure 1 is a side view of a plow, showing my scraper in position. Fig. 2 is a plan of the scraper, and showing the couplings by which it is attached to any plow.

A is the beam of plow, which should be substantially constructed to resist the strain put upon it by the introduction of this my scraper C, which has an adjustable slot, E, and thumb-screw F, which is attached to the arm G, which is securely attached to A—the beam of plow.

The cotton to be scraped and dirted, on entering the field I adjust my scraper C by loosening the thumb-screw F, and, by the aid of the slot E, I am able to get the exact elevation of the stand or ridge, and allows me to dirt close to or far from the young growing cotton, thus lightening the work one-half, and at the same time scrape and dirt.

I claim as my invention—

The combination and arrangement of the slotted share C, slotted plate E, screw F, and standard G, as and for the purpose hereinbefore set forth.

THOMAS H. TRANTHAM.

Witnesses:
LOUIS P. WILKERSON,
J. S. STRICKLER.